(12) United States Patent  
Tanaka et al.

(10) Patent No.: US 11,478,062 B2
(45) Date of Patent: Oct. 25, 2022

(54) MAKEUP ITEM PRESENTING SYSTEM, MAKEUP ITEM PRESENTING METHOD, AND MAKEUP ITEM PRESENTING SERVER

(71) Applicant: PANASONIC INTELLECTUAL PROPERTY MANAGEMENT CO., LTD., Osaka (JP)

(72) Inventors: Yoshiteru Tanaka, Fukuoka (JP); Phu Nguyen, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 789 days.

(21) Appl. No.: 16/473,534

(22) PCT Filed: Sep. 22, 2017

(86) PCT No.: PCT/JP2017/034236
§ 371 (c)(1),
(2) Date: Jun. 25, 2019

(87) PCT Pub. No.: WO2018/123165
PCT Pub. Date: Jul. 5, 2018

(65) Prior Publication Data
US 2020/0214427 A1 Jul. 9, 2020

(30) Foreign Application Priority Data

Dec. 28, 2016 (JP) .............................. JP2016-256842

(51) Int. Cl.
*A45D 44/00* (2006.01)
*G06Q 30/06* (2012.01)
(Continued)

(52) U.S. Cl.
CPC ....... *A45D 44/005* (2013.01); *G06Q 30/0643* (2013.01); *G06V 40/169* (2022.01); *G09B 9/00* (2013.01)

(58) Field of Classification Search
CPC ............... A45D 44/005; G06V 40/169; G06Q 30/0643; G09B 9/00
See application file for complete search history.

(56) References Cited

U.S. PATENT DOCUMENTS

2015/0118655 A1* 4/2015 Yamanashi ............ G09B 19/00
434/100
2015/0366328 A1* 12/2015 Tamura ................... G06T 11/00
434/100

FOREIGN PATENT DOCUMENTS

| JP | 2000-011145 A | | 1/2000 |
|---|---|---|---|
| JP | 2014093043 A | * | 5/2014 |
| JP | 2014-149677 A | | 8/2014 |

* cited by examiner

*Primary Examiner* — Xin Sheng
(74) *Attorney, Agent, or Firm* — Greenblum & Bernstein, P.L.C.

(57) ABSTRACT

A terminal images first and second images respectively indicating facial images of a user before and after makeup, acquires information on a type or region of the makeup performed by the user, and transmits the first and second images and the information on the type or region of the makeup in association with each other to a server. The server deduces a makeup color of the makeup performed by the user based on the first and second images and the information on the type or region of the makeup performed by the user, and extracts at least one similar makeup item having the makeup color based on information on the makeup color and a makeup item database, and transmits information on at least one similar makeup item to the terminal. A terminal (Continued)

displays information on at least one similar makeup item transmitted from the server to a display unit.

10 Claims, 10 Drawing Sheets

(51) Int. Cl.
  *G06V 40/16* (2022.01)
  *G09B 9/00* (2006.01)

US 11,478,062 B2

MAKEUP ITEM PRESENTING SYSTEM, MAKEUP ITEM PRESENTING METHOD, AND MAKEUP ITEM PRESENTING SERVER

TECHNICAL FIELD

The present disclosure relates to a makeup item presenting system, a makeup item presenting method, and a makeup item presenting server that search for makeup items similar to those possessed by a user and present the similar makeup items to the user.

BACKGROUND ART

As technology relating to virtual makeup that virtually applies makeup to an image obtained by photographing a person's face by image processing, for example, in PTL 1, in application of a dedicated terminal installed in a storefront or a privately possessed user terminal such as a smartphone, a user selects a makeup item provided by a makeup item manufacturer, and an image after image processing in which makeup is virtually applied to a user's face by using the selected makeup item.

The technology disclosed in PTL 1 calculates an average value of hue, saturation, and lightness of pixels of a typical color of a lip region extracted from a facial image having three primary colors, and calculates re-applying deviation between a target lipstick color to be re-applied and the average value of the pixels of the typical color. Further, hue, saturation, and lightness of a new pixel are calculated by adding the re-applying deviation to the hue, saturation, and lightness of each pixel in the lip region, and the calculated value is converted into pixels used for displaying the three primary colors. As a result, it is possible to obtain a facial image in which the color of the lipstick is re-applied with hue, saturation, and lightness which are close to the characteristics of human eyes.

For example, in the application of the dedicated terminal in the storefront or the user terminal such as the smartphone, the user considers which one to purchase while looking at photographs of the makeup items.

On the other hand, the user may desire to use makeup items possessed by herself or himself or makeup items which are the same as (similar to) her or his own makeup items (hereinafter, referred to as "similar makeup item" in some cases).

However, in the application of the dedicated terminal in the storefront or the user terminal, there are some cases in which the makeup items possessed by the user (in other words, makeup items matching a user's skin and being in favor with the user herself or himself) or similar makeup items are not registered on a database. In this case, it is not possible to find out the makeup items desired by the user, and it is not convenient for the user. In general, when purchasing the makeup items, it is not possible to know whether coloration of the makeup items is as the user's own expected color without actually trying to apply.

The present disclosure is to improve convenience when the user selects the makeup item by extracting one or more makeup items similar to those possessed by the user, and presenting the extraction results of one or more similar makeup items on the user terminal.

CITATION LIST

Patent Literature

PTL 1: Japanese Patent Unexamined Publication No. 2000-11145

SUMMARY OF THE INVENTION

According to the present disclosure, there is provided a makeup item presenting system in which a terminal includes a display unit, and a server are communicably connected to each other, the terminal includes an imaging unit that images each of a first image indicating a facial image of a user before makeup and a second image indicating a facial image of the user after makeup, an instruction unit that receives a designation of information on a type or region of makeup performed by the user, and a first communication unit that transmits, to the server, the captured first image and second image and information on a designated type or region of makeup in association with each other, and the server includes a deduction unit that deduces a makeup color of the makeup performed by the user based on the first image and the second image and the information on the type or region of the makeup performed by the user, transmitted from the first communication unit, an extraction unit that extracts at least one similar makeup item having the deduced makeup color based on information on the deduced makeup color and a makeup item database, and a second communication unit that transmits information on at least one extracted similar makeup item to the terminal, and the terminal displays the information on at least one similar makeup item transmitted from the second communication unit to the display unit.

According to the present disclosure, there is further provided a makeup item presenting method in a makeup item presenting system in which a terminal including a display unit, and a server are communicably connected to each other, the method including imaging each of a first image indicating a facial image of a user before makeup and a second image indicating a facial image of the user after makeup, receiving a designation of information on a type or region of makeup performed by the user, and transmitting to the server the captured first image and second image and information on a designated type or region of makeup in association with each other, using the terminal; and deducing a makeup color of the makeup performed by the user based on the first image and the second image transmitted from the terminal and the information on the type or region of the makeup performed by the user, extracting at least one similar makeup item having the deduced makeup color based on information on the deduced makeup color and a makeup item database; transmitting information on at least one extracted similar makeup item to the terminal, using the server; and displaying the information on at least one similar makeup item transmitted from the server to the display unit, using the terminal.

According to the present disclosure, there is further still provided a makeup item presenting server which is communicably connected to a terminal including a display unit, the server including: a communication unit that receives a first image indicating a facial image of a user before makeup, a second image indicating a facial image of the user after makeup, and information on a type or region of makeup performed by the user, transmitted from the terminal, a deduction unit that deduces a makeup color of the makeup performed by the user based on the received first image, second image, and information on the type or region of the makeup performed by the user, and an extraction unit that extracts at least one similar makeup item having the deduced makeup color based on information on the deduced makeup color and a makeup item database, in which the communication unit transmits the information on at least one extracted similar makeup item to the terminal and causes the terminal to display the information on the display unit.

According to the present disclosure, there is further still provided a makeup item presenting method using a makeup item presenting server which is communicably connected to a terminal including a display unit, the method including: receiving a first image indicating a facial image of a user before makeup, a second image indicating a facial image of the user after makeup, and information on a type or region of makeup performed by the user, transmitted from the terminal, deducing a makeup color of the makeup performed by the user based on the received first image, second image, and information on the type or region of the makeup performed by the user, extracting at least one similar makeup item having the deduced makeup color based on information on the deduced makeup color and a makeup item database, and transmitting the information on at least one deduced similar makeup item to the terminal to display the information on the display unit of the terminal.

According to the present disclosure, it is possible to improve convenience when the user selects the makeup item by extracting one or more makeup items similar to those possessed by the user, and presenting the extraction results of one or more similar makeup items on the user terminal.

DESCRIPTION OF EMBODIMENTS

Hereinafter, an embodiment (hereinafter, referred to as "the present embodiment") which specifically discloses a makeup item presenting system, a makeup item presenting method and a makeup item presenting server according to the present invention will be specifically described with reference to the drawings as appropriate. However, unnecessarily detailed description may be omitted. For example, the detailed description of already well-known matter and overlapping description with respect to substantially the same configuration may be omitted. This is because the following description is prevented from unnecessarily becoming redundant, and an understanding of the person skilled becomes easy. Note that, drawings and the following description are provided for sufficient understanding of the present disclosure for a person skilled, and thereby, the present disclosure is not intended to be limited to a subject described in the range of the claims.

Figure 1:
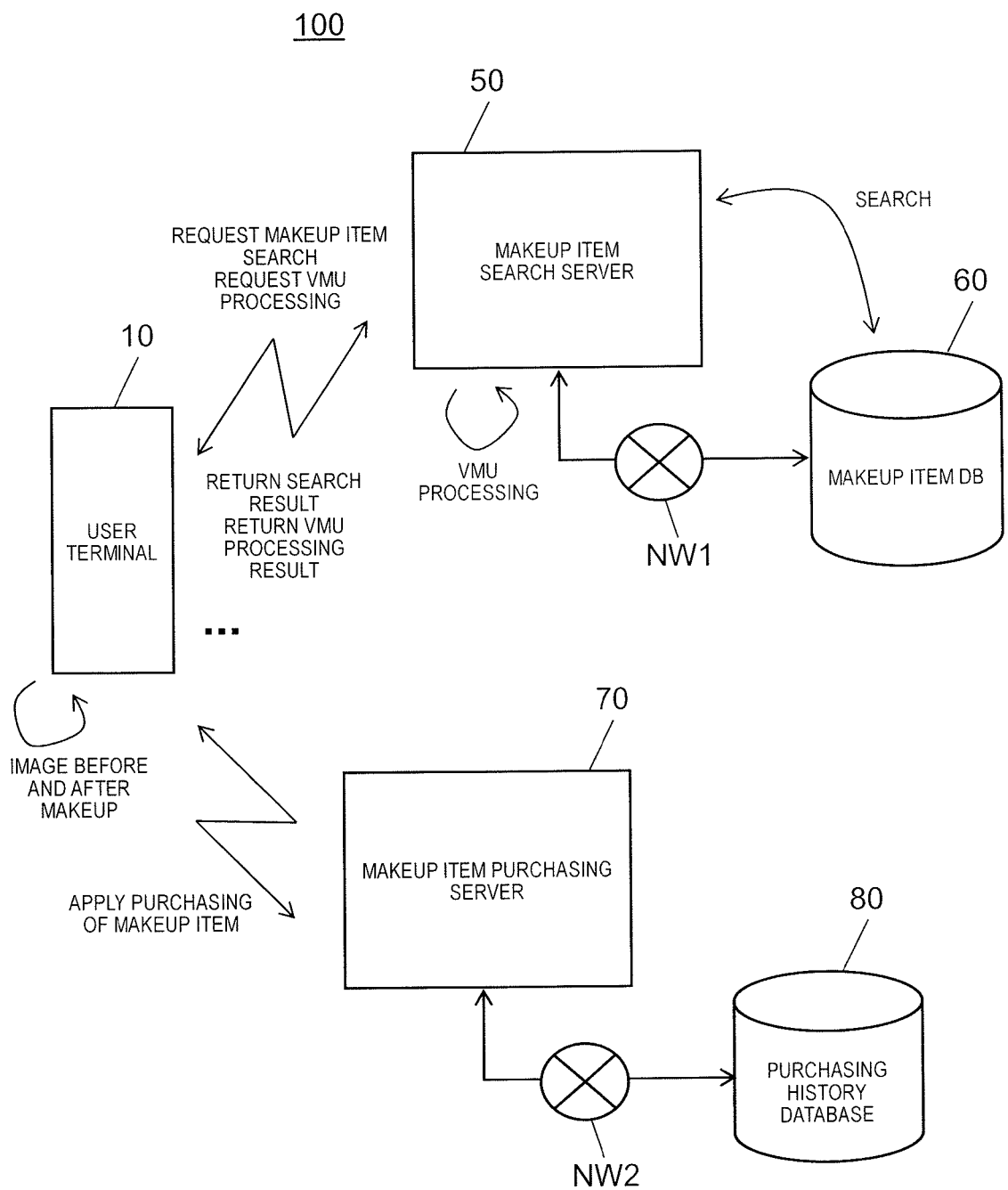
FIG. 1 is a block diagram illustrating an example of a system configuration of a makeup item presenting system according to the present embodiment.

Configuration of makeup item presenting system 100 of the present embodiment will be described with reference to FIG. 1. FIG. 1 is a block diagram illustrating an example of a system configuration of makeup item presenting system 100 according to the present embodiment. In the following description, a user for makeup item presenting system 100 will be simply referred to as a "user" and will be described by exemplifying a female user.

Makeup item presenting system 100 as illustrated in FIG. 1 is configured to include user terminal 10 as an example of a terminal possessed by the user, makeup item search server 50 as an example of a server or a makeup item presenting server, makeup item database (DB: Database) 60, makeup item purchasing server 70, and purchasing history database (DB) 80. Hereinafter, the makeup item database is referred to as "makeup item DB", and the purchasing history database is referred to as "purchasing history DB". Makeup item DB 60 and makeup item search server 50 may be communicably connected via network NW1, and makeup item DB 60 may be provided in makeup item search server 50. Purchasing history DB 80 and makeup item purchasing server 70 may be communicably connected via network NW2, purchasing history DB 80 may be provided in makeup item purchasing server 70.

Networks NW1 and NW2 are networks configured using a wire, and for example, local area network (LAN) communication network. In addition, networks NW1 and NW2 may be networks configured using wireless communication, and if the wireless communication is possible between makeup item DB 60 and makeup item search server 50, and between purchasing history DB 80 and makeup item purchasing server 70, the wireless communication method does not matter.

User terminal 10 is a wirelessly communicable terminal which the user can carry, and is, for example, a mobile phone, a smartphone or a tablet terminal. User terminal 10 may not have a telephone function. User terminal 10 is connected to makeup item search server 50 and makeup item purchasing server 70 in a wirelessly communicable manner.

An operation outline of makeup item presenting system 100 of the present embodiment is as follows.

User terminal 10 images and acquires a facial image (an example of the second image, hereinafter, referred to as "makeup facial image") after the user has actually performed makeup using the facial image (an example of the first image, hereinafter, referred to as "bare skin facial image") before the user performs makeup and the makeup item possessed by the user (in other words, the makeup items that match well with the user's skin and that the user likes, the same applies hereinafter). User terminal 10 transmits a makeup item search request including at least the bare skin facial image and the facial image after makeup to makeup item search server 50. User terminal 10 receives and displays a search result list transmitted from makeup item search server 50 as a result of search by referring to makeup item DB 60 by makeup item search server 50 in respond to makeup item search request. In a case where there are makeup items in which the user is interested in the search result list, user terminal 10 transmits a processing request (hereinafter, referred to as "VMU processing request") of virtual makeup (VMU: Virtual Makeup) using the makeup item to makeup item search server 50. User terminal 10 receives and displays a virtual makeup-processed facial image (hereinafter, referred to as "VMU facial image") transmitted from makeup item search server 50 as a result of makeup item search server 50 performing virtual makeup processing on the bare skin facial image in response to the VMU processing request.

In a case where the user found a makeup item that she or he wants to purchase as a result of viewing the search result list and the VMU facial image displayed on display 15, user terminal 10 transmits purchasing application of the makeup item to be purchased to makeup item purchasing server 70 in accordance with the user's purchase operation. As a result, the user can confirm the makeup item, which is the same as (similar to) her or his own makeup item, extracted by makeup item search server 50 on display 15 of user terminal 10, and can purchase it as needed.

When receiving makeup item search request data transmitted from user terminal 10, makeup item search server 50 deduces makeup color of the makeup item (for example, the makeup item possessed by the user) used for makeup by the user based on the bare skin facial image and the makeup facial image included in the makeup item search request. A method of deducing the makeup color will be described below. Makeup item search server 50 searches (extracts) one or more similar makeup items having deduced makeup color, and transmits the search result (extracted result) to user terminal 10 as the search result list, based on the information on the deduced makeup color and makeup item DB 60. When receiving the VMU processing request transmitted from user terminal 10, makeup item search server 50 performs virtual makeup processing on the bare skin facial image of the user based on the information on the makeup item included in the VMU processing request, and transmits the result (that is, VMU facial image) to user terminal 10.

Makeup item DB 60 registers and holds information on a plurality of makeup items. The information on the makeup item includes, for example, a manufacturer name of the makeup item, a name of the makeup item, a color of the makeup item (that is, the color to be composited on the skin when the makeup item is applied), a type of the makeup item (for example, foundation, lip, cheek, eyeshadow, and mascara, the same applies hereinafter), and price of the makeup item (for example, manufacturer suggested retail price that is the basis of sales price), but is not limited thereto.

When receiving the makeup item purchasing application transmitted from user terminal 10, makeup item purchasing server 70 processes various procedures (for example, a settlement procedure) related to the purchase of the makeup item targeted for the purchasing application, and writes the processing result into purchase history DB to register the purchase.

Purchase history DB 80 registers and holds purchasing history of the makeup items for which various procedures related to the purchase have been completed by makeup item purchasing server 70. The purchasing history includes, for example, an identification number of the makeup item to be purchased, an identification number of user terminal 10, a purchaser's name and address, and it is needless to say that the purchasing history is not limited thereto.

Figure 2:
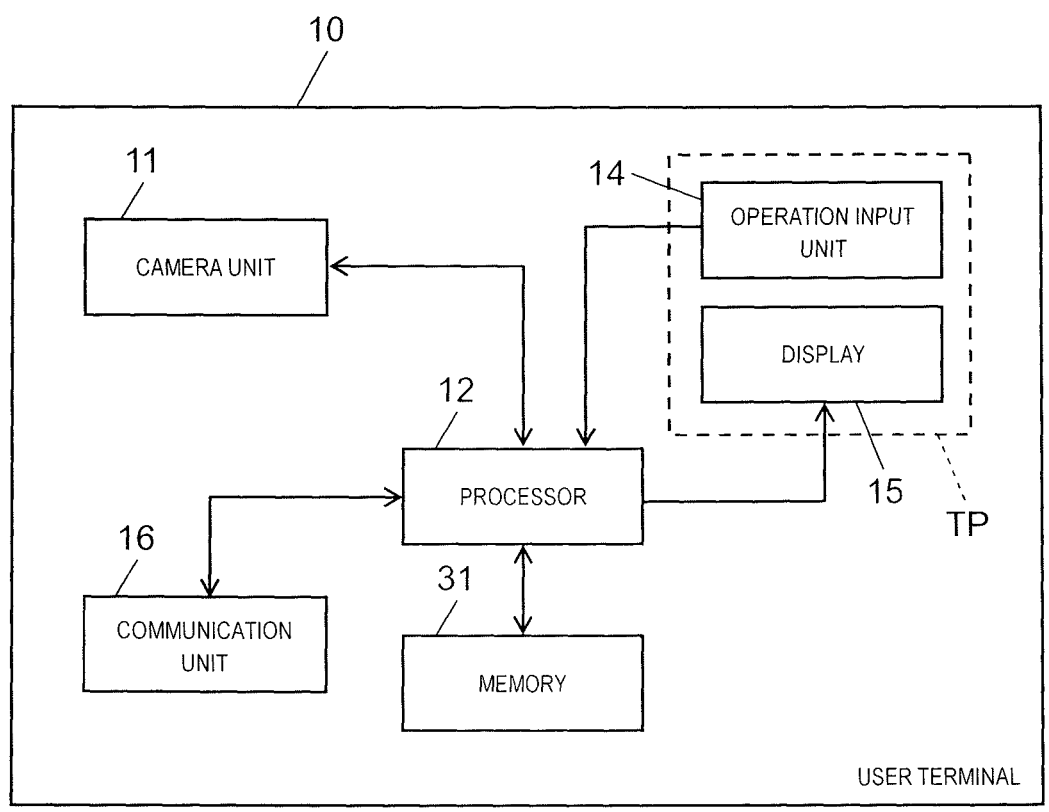
FIG. 2 is a block diagram illustrating an example of a hardware configuration of a user terminal of the present embodiment.

FIG. 2 is a block diagram illustrating an example of a hardware configuration of user terminal 10 of the present embodiment. User terminal 10 as illustrated in FIG. 2 is configured to include camera unit 11, processor 12, memory 13, operation input unit 14, display 15, and communication unit 16. Operation input unit 14 and display 15 may constitute touch panel TP capable of detecting the user's operation (for example, touch and tap). User terminal 10 as illustrated in FIG. 2 may or may not have a telephone function.

Camera unit 11 as an example of an imaging unit is configured to include lens, an image sensor, and a signal processing unit. The lens allows an image to be formed with light incident from user terminal 10 so as to be imaged in the image sensor. The image sensor is configured to include, for example, a charge coupled device (CCD) or a complementary metal oxide semiconductor (CMOS). The image sensor images an optical image formed through a lens by photoelectric conversion, and outputs an electrical signal of the imaged optical image to the signal processing unit. The signal processing unit performs existing image processing using the output (that is, the electrical signal of the optical image) of the image sensor so as to generate an RGB image or a YUV image that constitutes an image that satisfies a predetermined format (for example, H.264). Camera unit 11 images and acquires the bare skin facial image of the user and the makeup facial image of the user using the lens, the image sensor, and the signal processing unit described above, and the bare skin facial image of the user and the makeup facial image of the user are output to processor 12.

Processor 12 is configured to include, for example, a central processing unit (CPU), a micro processing unit (MPU), or a digital signal processor (DSP). Processor 12 performs signal processing for overall control of the operation of each part of user terminal 10, input and output processing of data between other parts, arithmetic processing of data, and storage processing of data.

Processor 12 generates makeup item search request data including the bare skin facial image and the makeup facial image of the user, the information on the bare skin region in the bare skin facial image described later and the makeup region in the makeup facial image, and a search parameter (refer to the description later), and then outputs the makeup item search request data to communication unit 16. In a case where the type of makeup item with which the user has actually performed makeup is selected via operation input unit 14 on the screen on which the bare skin facial image and the makeup facial image of the user are displayed on display 15, processor 12 may specify the region where the user has actually performed makeup (that is, a makeup region), and include the specified makeup region information in the search request data described above.

In a case where any similar makeup item is selected from the search result list displayed on display 15, processor 12 generates data (hereinafter referred to as "VMU processing request data") including information on the selected similar makeup item and a processing request for virtual makeup using the similar makeup item and outputs it to communication unit 16.

Memory 13 includes a random access memory (RAM) operating as a work memory at the time of operation (processing) of processor 12 and a read only memory (ROM) for storing a program and data (for example, various types of applications) for causing processor 12 to operate. Further, memory 13 includes a semiconductor memory (for example, a flash memory) for storing and holding data generated by processor 12, for example, even in a case where user terminal 10 is turned off.

Operation input unit 14 as an example of the instruction unit receives the user's operation (for example, touch and tap) on various screens displayed on display 15. In response to the user's operation, operation input unit 14 receives, for example, the designation of information on the type or region of the makeup that applied by the user on her or his face, and outputs the information on the type or the region of the makeup to processor 12.

Display 15 as an example of the display unit is configured to include, for example, a Liquid Crystal Display (LCD) or an organic electroluminescence (EL), and displays the screens of the various applications that are installed to be executable on user terminal 10 in respond to the user's operation.

Communication unit 16 as an example of the first communication unit transmits and receives information or data to or from makeup item search server 50 or makeup item purchasing server 70 using a predetermined wireless communication method (wireless LAN, for example, Wi-Fi (registered trademark)).

Figure 3:
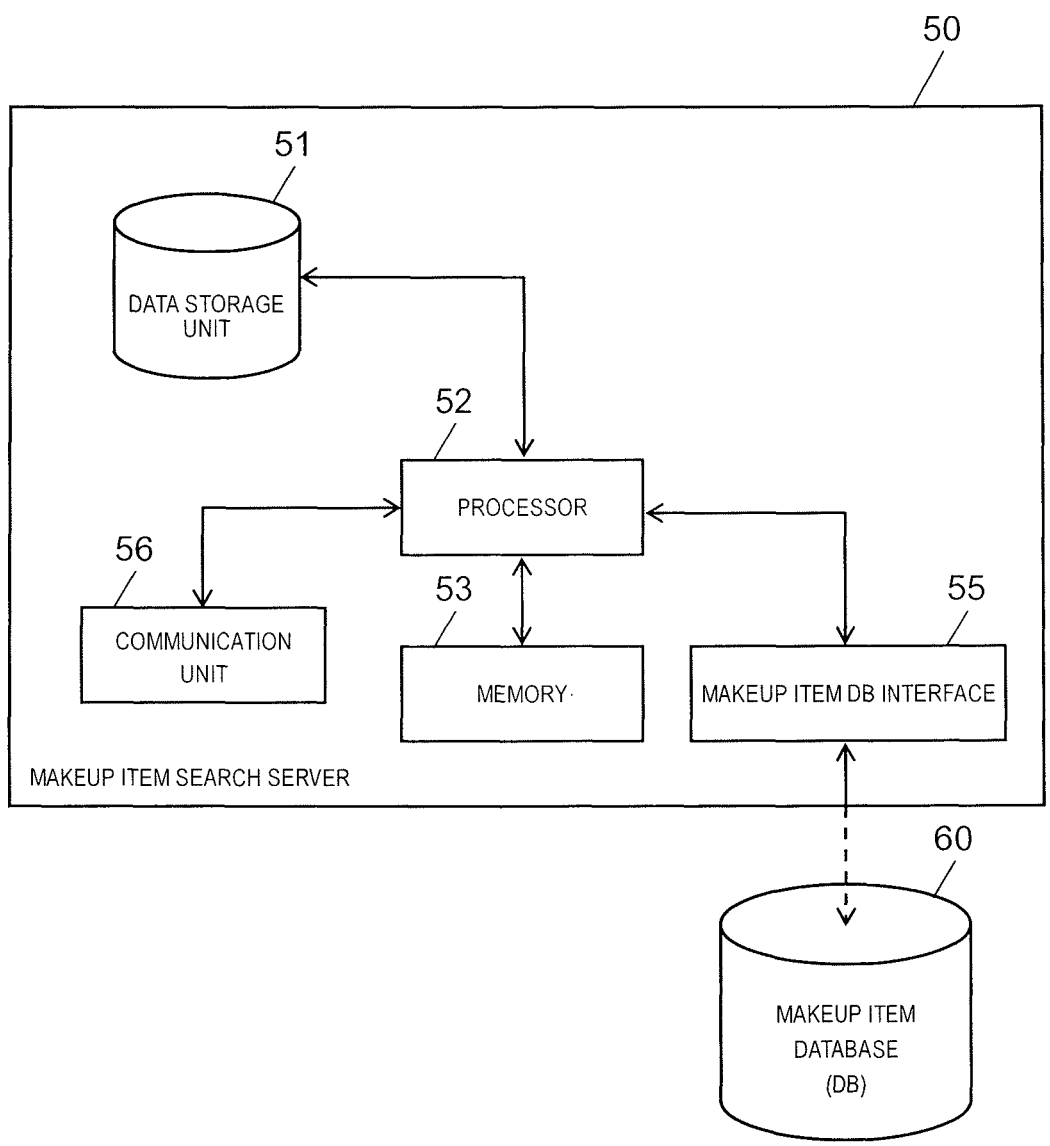
FIG. 3 is a block diagram illustrating an example of a hardware configuration of a makeup item search server of the present embodiment.

FIG. 3 is a block diagram illustrating an example of a hardware configuration of makeup item search server 50 of the present embodiment. Makeup item search server 50 illustrated in FIG. 3 is configured to include data storage unit 51, processor 52, memory 53, makeup item DB interface 55, and communication unit 56.

Data storage unit 51 is configured to include, for example, a flash memory, a hard disk drive (HDD), or a solid state drive (SSD), and stores various data as processing results of processor 52.

Processor 52 is configured to include, for example, CPU, MPU, or DSP. Processor 52 performs signal processing for overall control of the operation of each part of processor 52, input and output processing of data between other parts, arithmetic processing of data, and storage processing of data. The operation (processing) of processor 52 will be specifically described later with reference to FIG. 4.

Memory 53 includes a RAM that operates as a work memory at the time of operation (processing) of processor 52 and a ROM that stores a program and data for operating processor 52 (for example, search processing of the makeup item in response to a request from user terminal 10 and an application capable of executing virtual makeup processing in response to a request from user terminal 10).

Makeup item DB interface 55 is an interface for communication between makeup item search server 50 and makeup item DB 60, which passes information or data from processor 52 to makeup item DB 60 to make an inquiry, or passes information or data on response results from makeup item DB 60 to processor 52.

Communication unit 56 as an example of the second communication unit transmits and receives information and data to and from makeup item DB 60 using a predetermined communication method (for example, a wired LAN communication method or a wireless LAN communication method). Communication unit 56 exchanges information and data with user terminal 10 using a predetermined wireless communication method (wireless LAN, for example, Wi-Fi (registered trademark)).

Figure 4:
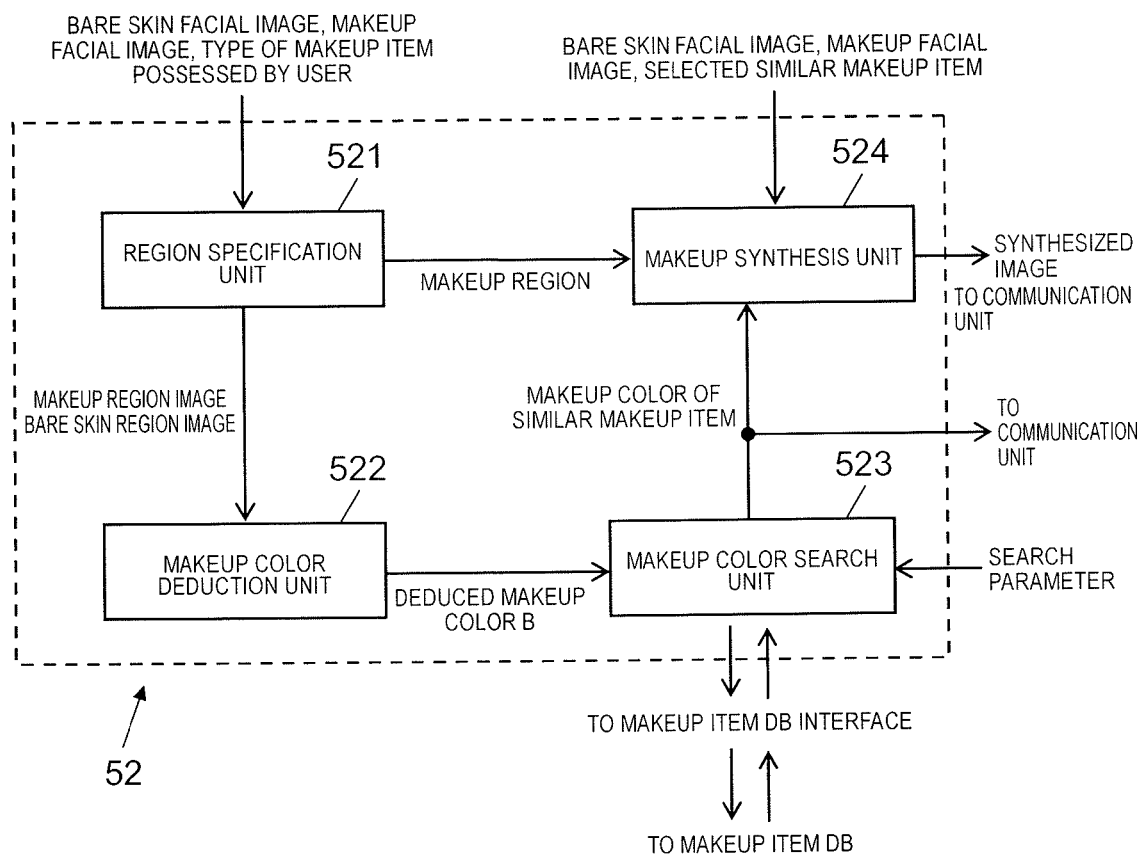
FIG. 4 is a block diagram illustrating an example of a specific configuration of a software function in a processor of the makeup item search server of the present embodiment.

FIG. 4 is a block diagram illustrating an example of a specific configuration of a software function in processor 52 of makeup item search server 50 of the present embodiment. Processor 52 includes region specification unit 521, makeup color deduction unit 522, makeup color search unit 523, and makeup synthesis unit 524. Programs and data capable of executing the processes of region specification unit 521, makeup color deduction unit 522, makeup color search unit 523, and makeup synthesis unit 524 are stored in memory 53 in advance. When processor 52 reads out and executes these programs and data from memory 53, and region specification unit 521, makeup color deduction unit 522, makeup color search unit 523, and makeup synthesis unit 524 are configured in processor 52, and the operation (processing) of each unit is executed by the cooperation of processor 52 and memory 53.

Region specification unit 521 acquires the makeup item search request data transmitted from user terminal 10. The makeup item search request data includes, for example, each data of the bare skin facial image and the makeup facial image, and information on the type of makeup items or the region of makeup (for example, information on the type of the makeup item used when the user has actually performed makeup (that is, the makeup item possessed by the user), or information on the region on which the user has actually performed makeup, the same applies hereinafter).

Region specification unit 521 specifies a region (that is, a makeup region) on which the user has actually performed makeup by using the acquired information and data, and cuts out an image of the makeup region specified in each image. Region specification unit 521 outputs images obtained by the cut-out (that is, an image corresponding to the makeup region of the bare skin facial image (hereinafter, referred to as "bare skin region image") and an image corresponding to the makeup region of the makeup facial image (hereinafter, referred to as "makeup region image")) to makeup color deduction unit 522. Further, region specification unit 521 outputs information on the specified makeup region (that is, the makeup region information) to makeup synthesis unit 524.

Region specification unit 521 specifies a region (that is, the makeup region) on which makeup has actually performed by the user in the facial image of the user based on, for example, the information on the type of makeup item (for example, a lip) and the difference between the bare skin facial image and the makeup facial image. However, it is needless to say that the method of specifying the makeup region in region specification unit 521 is not limited to the method using the difference between the bare skin facial image and the makeup facial image. Region specification unit 521 specifies the makeup region of the foundation as the entire face, the makeup region of the lip as a lip, the makeup region of the cheek as a cheek, the makeup region of the eye shadow as a part above and below the eyes, and the makeup region of the mascara as the upper and lower eyelashes of the eyes.

In a case where makeup region information is included in the search request data transmitted from user terminal 10, region specification unit 521 may cut out the bare skin region image and the makeup region image corresponding to each makeup region information in the bare skin facial image and the makeup facial image and output the cut-out bare skin region image and the makeup region image to makeup color deduction unit 522 without specific processing of the makeup region in each data of the bare skin facial image and makeup facial image.

Makeup color deduction unit 522 as an example of the deduction unit acquires the bare skin region image and the makeup region image output from region specification unit 521, and the information on the type of the makeup item included in the makeup item search request data transmitted from user terminal 10. Makeup color deduction unit 522 deduces makeup color B of the makeup item used by the user for makeup (for example, the makeup item possessed by the user) based on the bare skin region image and the makeup region image and the information on the type of the makeup item. Makeup color deduction unit 522 outputs deduced makeup color B to makeup color search unit 523.

Here, a method of deducing makeup color B in makeup color deduction unit 522 will be described.

For example, makeup color deduction unit 522 deduces (calculates) color (that is, coloring of the makeup item) of the makeup item that is applied to the user's bare skin when makeup is performed using the makeup item possessed by the user according to Equation (1) by using a color blend ratio α determined in advance for each portion (that is, a target portion of the makeup) to be made up by the user. In Equation (1), B represents a makeup color (that is, the color of the makeup that is applied to the user's bare skin when the user has performed makeup using makeup item possessed by the user, in other words, a color that is synthesized when the makeup item is applied), A indicates a color of an original skin (that is, the color in the makeup region of the bare skin before makeup), and C indicates a color after makeup (that is, the color in the makeup region after makeup). α represents a blend ratio, and for example, α is 0.9 in a case of lip and α is 0.67 in a case of cheek, and the value varies depending on the type of makeup item. However, the value of α is an example.

[Equation 1]

$$B = A + \frac{(C - A)}{\alpha} \quad (1)$$

In other words, makeup color deduction unit 522 can specifically deduce the coloring (that is, makeup color B) of the makeup item possessed by the user in consideration of the color of the user's skin (more specifically, the image (specifically, the bare skin region image and makeup region image) before and after makeup that is actually performed using the makeup item possessed by the user and the type of the makeup item.

Makeup color search unit 523 as an example of the extraction unit searches for one or more similar makeup items that have the same color as or similar to makeup color B by referring to makeup item DB 60 based on the information on makeup color B deduced by makeup color deduction unit 522 and the search parameter included in the makeup item search request data transmitted from user terminal 10. Makeup color search unit 523 extracts the search result as a search result list and outputs the result to each of the makeup synthesis unit 524 and communication unit 56. Here, the similar makeup item indicates a makeup item having the same color as or a similar (that is, very similar) color to makeup color B. The similar (that is, very similar) color is, for example, a color such that a distance between color (H) and makeup color B in HSL color space is less than a predetermined threshold (a predetermined value). In a case where the search request data transmitted from user terminal 10 does not include a search parameter, makeup color search unit 523 searches for one or more similar makeup items that have the same color as or similar to makeup color B by referring to makeup item DB 60 based on the information on makeup color B deduced by makeup color deduction unit 522.

Here, the search parameter is not limited to the case where the user requests a makeup item having the same color as makeup color B, but also, if necessary, is a parameter designated by user terminal 10 in order to include a color close to makeup color B, a color having a lightness larger or smaller than makeup color B, or a color having a saturation larger or smaller than makeup color B as a search target of makeup item search server 50. Examples of the search parameter include those having a short distance between color (H) and makeup color B in HSL color space (CIELCH color space, HSV color space, and LAB color space are also applicable, the same applies hereinafter), those having lightness (L) larger or smaller than makeup color B, and those having a saturation larger or smaller than makeup color B.

Makeup synthesis unit 524 acquires the bare skin facial image and the makeup facial image included in the makeup item search request data transmitted from user terminal 10, the information on the makeup region specified by region specification unit 521, information (that is, search result list) on the makeup color of one or more similar makeup items extracted from makeup color search unit 523, and information on the selected similar makeup item included in VMU processing request data transmitted from user terminal 10. The selected similar makeup item is, for example, any one of the similar makeup items selected by the user's operation after the search result list data including the information on one or more similar makeup items are displayed on user terminal 10. Makeup synthesis unit 524 as an example of the image processing unit generates a VMU facial image in which the virtual makeup processing is performed on the makeup region of the bare skin facial image using the selected similar makeup item. Makeup synthesis unit 524 generates data (hereinafter, referred to as "VMU processing data") of a symmetrical facial image which is symmetrically linked in association with the generated VMU facial image and the bare skin facial image, and outputs the generated data to communication unit 56.

Figure 5:
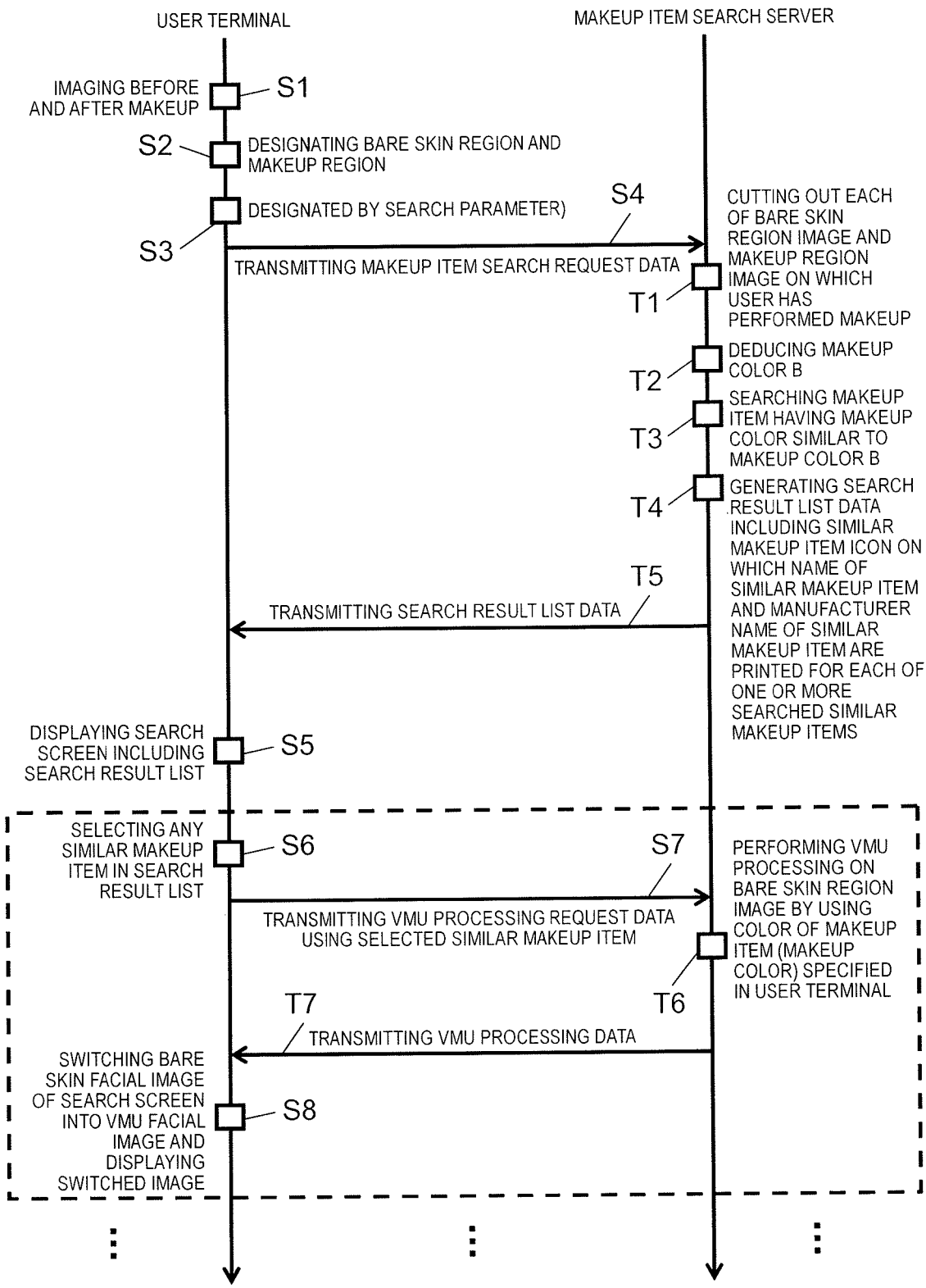
FIG. 5 is a sequence diagram specifically illustrating a first example of an operation procedure relating to search for similar makeup items between the user terminal and the makeup item search server of the present embodiment.
Figure 7:
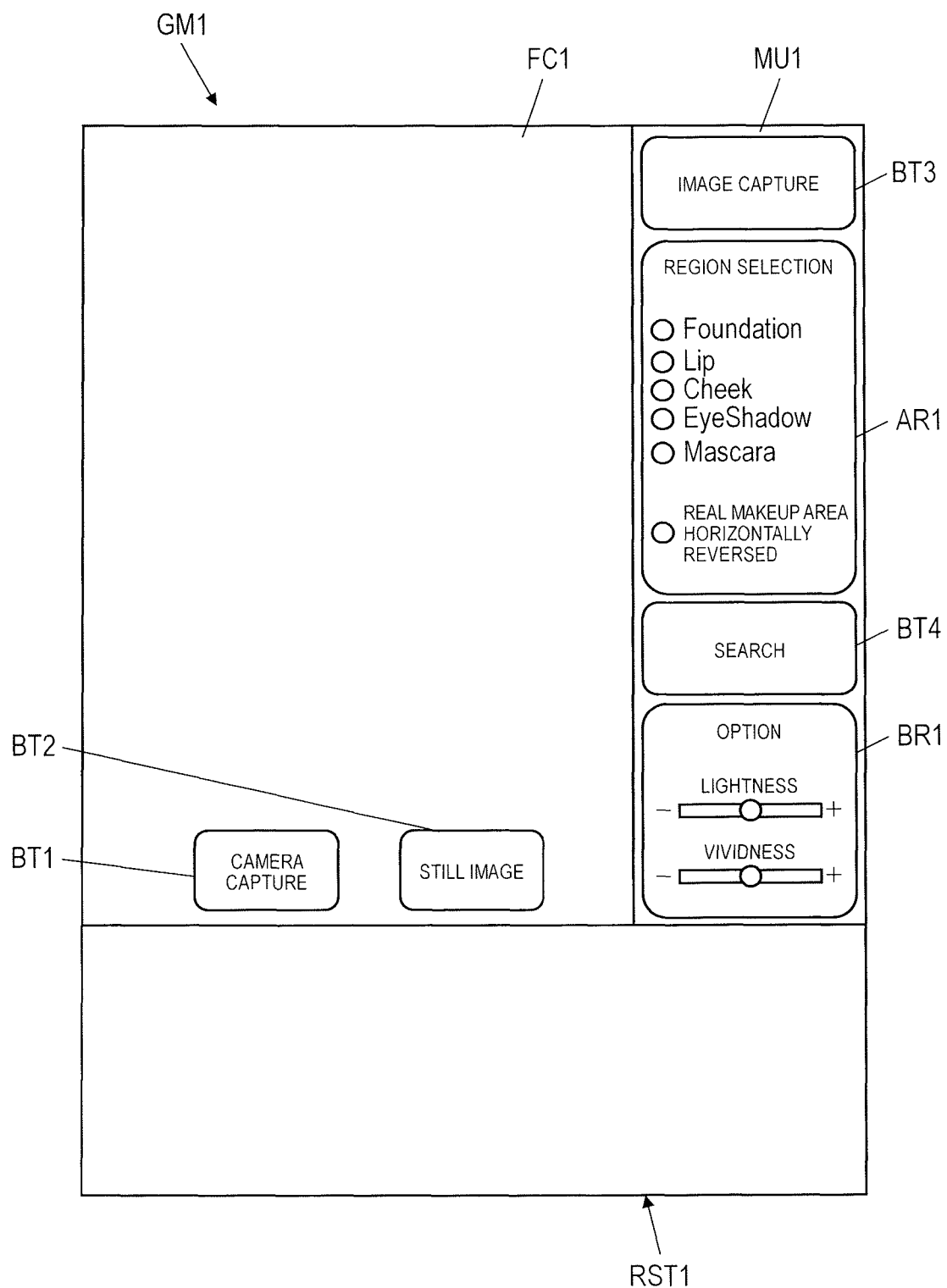
FIG. 7 is a diagram illustrating an initial screen displayed on the user terminal of the present embodiment.
Figure 8:
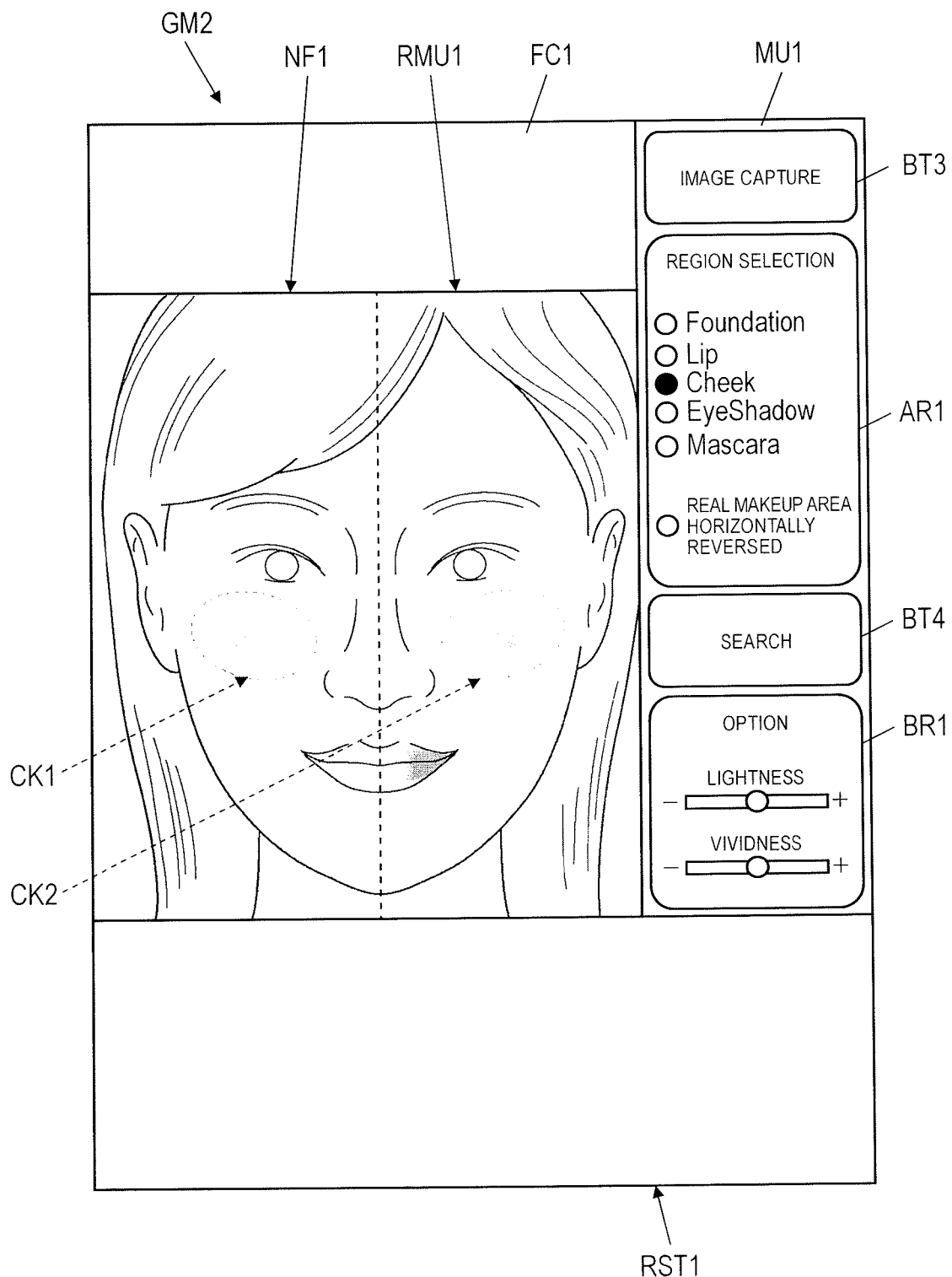
FIG. 8 is a diagram illustrating a part region selection screen displayed on the user terminal of the present embodiment.
Figure 9:
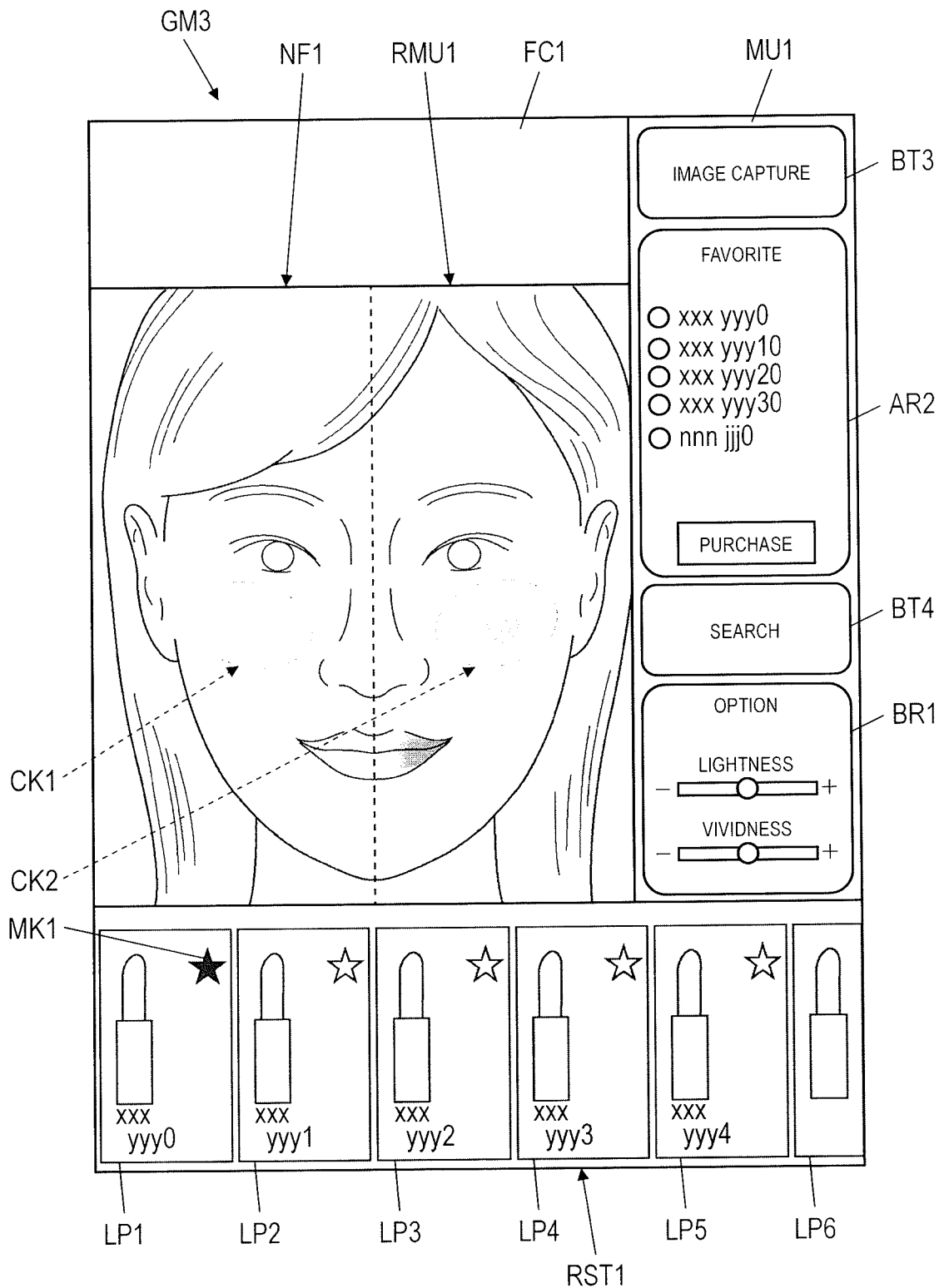
FIG. 9 is a diagram illustrating a search result list screen displayed on the user terminal of the present embodiment.

Next, a first example of an operation procedure of makeup item presenting system 100 of the present embodiment will be described with reference to FIG. 5 and FIG. 7 to FIG. 9. FIG. 5 is a sequence diagram specifically illustrating a first example of an operation procedure relating to search for similar makeup items between user terminal 10 and makeup item search server 50 of the present embodiment. FIG. 7 is a diagram illustrating initial screen GM1 displayed on user terminal 10 of the present embodiment. FIG. 8 is a diagram illustrating part region selection screen GM2 displayed on user terminal 10 of the present embodiment. FIG. 9 is a diagram illustrating search result list screen GM3 displayed on user terminal 10 of the present embodiment.

As a premise of the description of FIG. 5, initial screen GM1 as illustrated in FIG. 7 is displayed in user terminal 10. The various display screens illustrated in FIG. 7 to FIG. 9 are, for example, screens displayed in the makeup item presenting application usable in makeup item presenting system 100 of the present embodiment. The makeup item presenting application is installed to be executable on user terminal 10 in advance. Initial screen GM1 illustrated in FIG. 7 is displayed on display 15 of user terminal 10 when the makeup item presenting application is activated by the user's operation.

Initial screen GM1 illustrated in FIG. 7 includes facial image display region FC1, menu button display region MU1, and search result list display region RST1.

In facial image display region FC1, a facial image of the user is displayed, and camera capture button BT1 and still image button BT2 described later are displayed.

In menu button display region MU1, image capture button BT3, makeup selection region AR1, search button BT4, and option region BR1 are displayed.

Image capture button BT is a button for displaying camera capture button BT1 and still image button BT2 in facial image display region FC1 when being pressed.

In makeup selection region AR1, a plurality of candidates (for example, foundation, lip, cheek, eye shadow, and mascara) for designating the region of the user's face on which the user has performed makeup or the type of the makeup item with which the user has performed makeup to the face are displayed. In makeup selection region AR1, a button is also displayed so as to display a real makeup-free area in which bare skin facial image NF1 is displayed and a real makeup-containing area in which makeup facial image RMU1 is displayed while being horizontally reversed.

Search button BT4 is a button for making a request for searching for the same or similar makeup items (that is, the similar makeup items) to makeup item search server 50 when the user makeup using the existing makeup items.

Option region BR1 displays a slide bar for designating items (specifically, the lightness (brightness) and the vividness (saturation) of the color of the makeup item) which become options when searching for similar makeup items according to the user's request. The levels of the lightness and the vividness can be adjusted by the user's operation (for example, a drag operation) to the slide bar centering on makeup color B (refer to Equation (1)) deduced by makeup item search server 50.

In search result list display region RST1, the search result list data of similar makeup items transmitted from makeup item search server 50 is displayed (refer to FIG. 9).

In FIG. 5, when a user's operation, for example, pressing image capture button BT3 of initial screen GM1 is detected, user terminal 10 displays camera capture button BT1 and still image button BT2 in facial image display region FC1. When a user's operation of pressing camera capture button BT1 is detected, user terminal 10 activates the camera application. In the camera application, user terminal 10 images and acquires a facial image (the bare skin facial image) before the user performs makeup and a facial image (the makeup facial image) after the user has actually performed makeup with the makeup item possessed by the user (that is, a makeup item which matches the user's skin very much and is the user's favorite) (S1).

In step S1, when the user's operation of pressing still image button BT2 instead of camera capture button BT1 is detected, user terminal 10 may read still image data stored and held in memory 13, and allow the user to select at least one of the bare skin facial image and the makeup facial image described above (S1).

When acquiring the bare skin facial image and the makeup facial image in step S1, user terminal 10 displays, for example, a symmetrical facial image obtained by symmetrically connecting an image having the left half size of a bare skin facial image frame and an image having the right half size of a makeup facial image frame in facial image display region FC1 on initial screen GM1. When user terminal 10 displays the symmetrical facial image obtained by symmetrically connecting the image having the left half size of the bare skin facial image frame and the image having the right half size of the makeup facial image frame in facial image display region FC1, the display is switched from initial screen GM1 in FIG. 7 to part region selection screen GM2 in FIG. 8. In part region selection screen GM2 as illustrated in FIG. 8, the image having the left half size (½) of the frame of bare skin facial image NF1 is displayed in the real makeup-free area, and the image having the right half size of the frame of makeup facial image RMU1 is displayed in the real makeup-containing area.

After step S1, user terminal 10 receives designation of a region on which the user has performed makeup among the bare skin facial image and the makeup facial image in part region selection screen GM2 as illustrated in FIG. 8 (S2). Here, for example, in a case where the user has performed makeup by applying a cheek, cheek portion CK1 in bare skin facial image NF1 of the real makeup-free area and cheek portion CK2 in makeup facial image RMU1 of the real makeup-containing area are designated by the user's operation. User terminal 10 acquires information indicating a position of cheek portion CK1 (for example, a coordinate in the bare skin facial image) and information indicating a position of cheek portion CK2 (for example, a coordinate in the makeup facial image) by designation in step S2. The information indicating the position of cheek portion CK1 (for example, the coordinate in the bare skin facial image) and the information indicating the position of cheek portion CK2 (for example, the coordinate in the makeup facial image) may be specified in makeup item search server 50.

User terminal 10 selects, for example, the type (for example, the cheek) of the makeup item with which the user has actually performed makeup in part region selection screen GM2 as illustrated in FIG. 8, and further, which region in bare skin facial image NF1 and makeup facial image RMU1 is to be used for the processing of makeup item search server 50 may be directly designated by the user's operation on display 15. As a result, for example, in a case where the user performs somewhat complicated makeup, such as applying multiple coats on inner and outer corners of the eyes at the time of makeup of the eye shadow, or performs unique makeup in her or his own way, user terminal 10 can accurately acquire information on a region (the makeup region) in which the user has performed makeup, and can improve the deduction accuracy of makeup color B in makeup item search server 50.

In part region selection screen GM2 as illustrated in FIG. 8, in a case where at least one of the brightness and saturation of option region BR1 is designated by adjusting the slide bar, user terminal 10 acquires information on at least one of the designated brightness and saturation as a search parameter (S3). In a case where neither the brightness nor the saturation of the option region BR1 is designated by the user, the process of step S3 is omitted.

User terminal 10 generates the makeup item search request data including the bare skin facial image and the makeup facial image acquired in step S1, the information on the makeup region (that is, a corresponding region on which the user has performed makeup in the bare skin facial image, and a corresponding region on which the user has performed makeup in the makeup facial image) acquired in step S2, and as necessary, the information on the search option acquired in step S3, and the search request to makeup item search server 50. Makeup item search request data is used to request makeup item search server 50 to make a search request as to whether or not there is a makeup item having the same coloring as or similar to the color of the makeup item when the user has performed makeup using makeup item possessed by the user. The same applies hereinafter. User terminal 10 transmits the makeup item search request data to makeup item search server 50 (S4).

Makeup item search server 50 receives the makeup item search request data transmitted from user terminal 10 in step S4. Makeup item search server 50 cuts out and acquires each of the bare skin region image and the makeup region image of the portion on which the user has performed makeup based on the bare skin facial image and the makeup facial image and the information on the makeup region included in the makeup item request search data (T1).

Makeup item search server 50 deduces makeup color B of the makeup item (for example, the makeup item possessed by the user) used for makeup by the user based on the bare skin region image and the makeup region image acquired in step T1 and the information on the type of the makeup item included in the makeup item search request data transmitted from user terminal 10 (T2).

Makeup item search server 50 searches for one or more similar makeup items that have the same color as or similar to makeup color B by referring to makeup item DB 60 based on the information on makeup color B deduced in step T2 and the search parameter included in the makeup item search request data transmitted from user terminal 10 (T3).

Makeup item search server 50 extracts the search result (that is, information on one or more similar makeup items) extracted by the searching performed in step T3 as search result list data. Makeup item search server 50 generates a similar makeup item icon obtained by, for example, printing a name of the similar makeup item and a manufacturer name of the similar makeup item for each similar makeup item as an icon having a predetermined size with the color of the similar makeup item as a background color, as information on one or more similar makeup items (T4).

Makeup item search server 50 returns the search result list data generated in step T4 to user terminal 10 (T5).

User terminal 10 receives the search result list data returned from makeup item search server 50, and displays search result list screen GM3 in which the search result list data is displayed in search result list display region RST1 on display 15 (refer to S5, FIG. 9). Search result list display region RST1 of search result list screen GM3 in FIG. 9 displays similar makeup item icons LP1, LP2, LP3, LP4, LP5, and LP6 for the plurality of (for example, six) similar makeup items. User terminal 10 can scroll in the left-right direction by the user's operation to display similar makeup item icons other than similar makeup item icon LP6.

Similar makeup item icon LP1 has the manufacturer name "xxx" of the similar makeup item, the name "yyy0" of the similar makeup item, and the color of the lip of "yyy0" as a background color, and checkmark MK1 is given to a star-shaped mark indicating that the makeup item is registered as a user's favorite. The list of the makeup items registered as the user's favorite is indicated in association of favorite area AR2 with the manufacturer name and the name of the makeup items. When one of the makeup items indicated in favorite area AR2 is selected and the purchase button is pressed by the user's operation, user terminal 10 generates a purchasing application for the selected makeup item so as to transmit the generated purchasing application to makeup item purchasing server 70. As a result, the user can purchase any makeup item that she or he likes among the makeup items registered in favorite area AR2 via makeup item purchasing server 70 at any time.

In a case where any makeup item in favorite area AR2 is selected by the user's operation, user terminal 10 may generate and transmit a processing request of the virtual makeup using the selected makeup item (VMU processing request data to be described later) to makeup item search server 50. As a result, user terminal 10 can display the VMU facial image using the makeup items registered in favorite area AR2 by the user on display 15 by a simple operation of the user.

Similar makeup item icon LP2 has the manufacturer name "xxx" of the similar makeup item, the name "yyy1" of the similar makeup item, and the color of the lip of "yyy1" as a background color.

Similar makeup item icon LP3 has the manufacturer name "xxx" of the similar makeup item, the name "yyy2" of the similar makeup item, and the color of the lip of "yyy2" as a background color.

Similar makeup item icon LP4 has the manufacturer name "xxx" of the similar makeup item, the name "yyy3" of the similar makeup item, and the color of the lip of "yyy3" as a background color.

Similar makeup item icon LP5 has the manufacturer name "xxx" of the similar makeup item, the name "yyy4" of the similar makeup item, and the color of the lip of "yyy4" as a background color.

Similar makeup item icon LP6 has the manufacturer name "xxx" of the similar makeup item, the name "yyy5" of the similar makeup item, and the color of the lip of "yyy5" as a background color.

Figure 10:
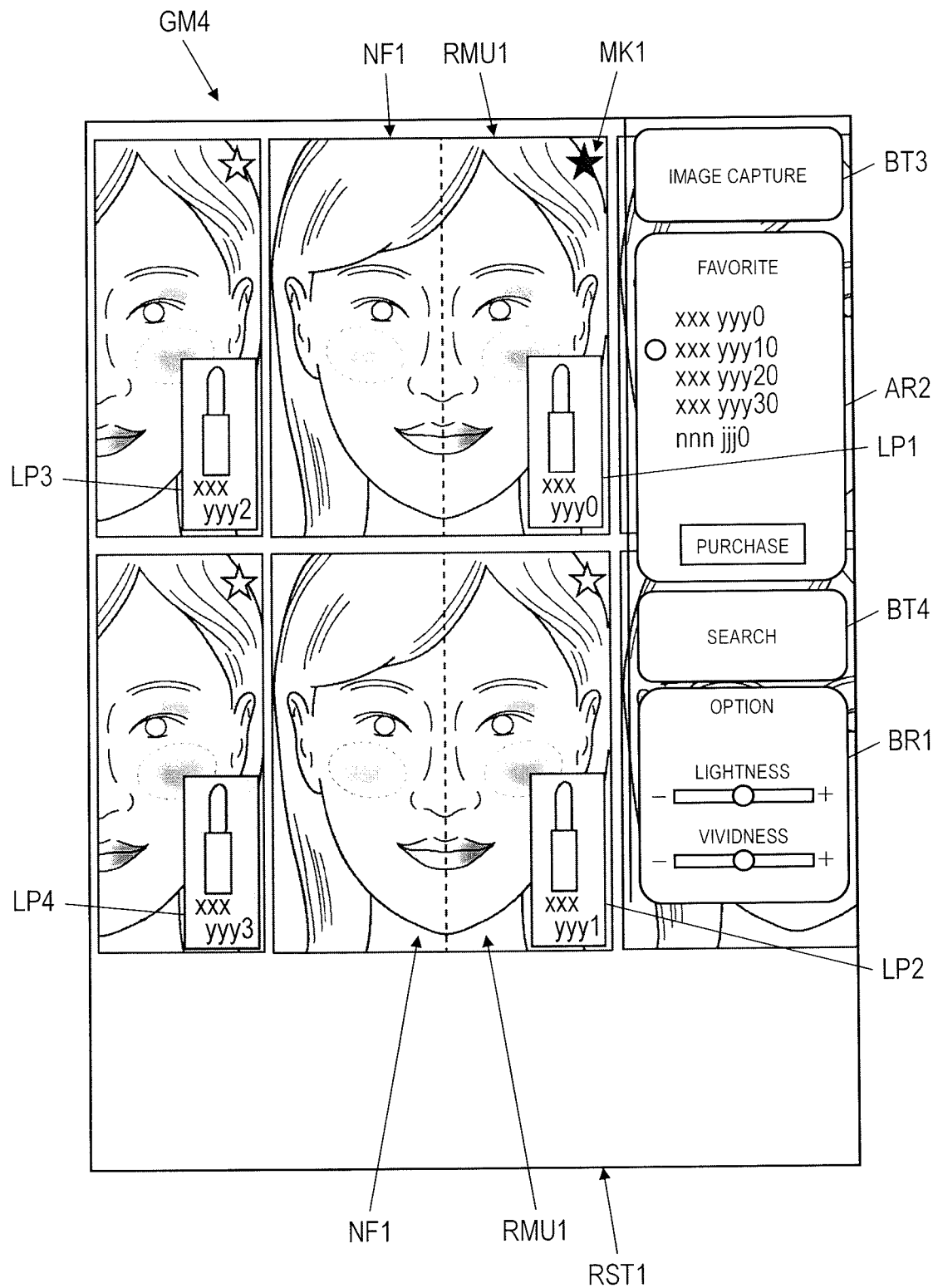
FIG. 10 is a diagram illustrating a search result list screen displayed on the user terminal of the present embodiment.

User terminal 10 may display search result list screen GM4 as illustrated in FIG. 10 on display 15 as another example of the search result list screen when receiving the search result list data returned from makeup item search server 50. FIG. 10 is a diagram illustrating search result list screen GM4 displayed on user terminal 10 of the present embodiment.

Unlike initial screen GM1 of FIG. 7, part region selection screen GM2 of FIG. 8, and search result list screen GM3 of FIG. 9, in search result list screen GM4 of FIG. 10, the symmetrical facial image obtained by symmetrically connecting the left half size image of the frame of bare skin facial image NF1 to the right half size image of the frame of makeup facial image RMU1 is associated with the similar makeup item icon for each similar makeup item one by one so as to display N (one or more integers) extracted similar makeup items in other regions except for search result list display region RST1. In FIG. 10, the star-shaped mark indicating that the makeup item is registered as a user's favorite is shown superimposed on the symmetrical facial image. In FIG. 10, similar to FIG. 9, a checkmark MK1 is given to the mark of the similar makeup item (manufacturer's name: xxx, name: yyy0).

When search result list screen GM3 of FIG. 9 or search result list screen GM4 of FIG. 10 is displayed on display 15 of user terminal 10, it is assumed that any similar makeup item is selected by the user's operation (S6). User terminal 10 generates VMU processing request data using the selected similar makeup item and transmits the generated VMU processing request data to makeup item search server 50 (S7).

When receiving VMU processing request data transmitted from user terminal 10, makeup item search server 50 performs the virtual makeup processing on the bare skin region image cut out in step T1 by using the color of the makeup item (makeup color) specified based on the information on similar makeup item included in VMU processing request data (T6). Makeup item search server 50 returns VMU processing data including VMU facial image after the virtual makeup processing to user terminal 10 (T7).

When receiving the VMU processing data transmitted from makeup item search server 50, user terminal 10 switches the user's bare skin facial image of at least one of search result list screen GM3 or search result list screen GM4 displayed on display 15 into VMU facial image included in VMU processing data and displays the switched image (S8). The processes after step S8 are total 5 processes of step S6→step S7 of user terminal 10→step T6→step T7 of makeup item search server 50→step S8 of user terminal 10 are similarly repeated as one set according to the number of similar makeup items selected in user terminal 10.

Figure 6:
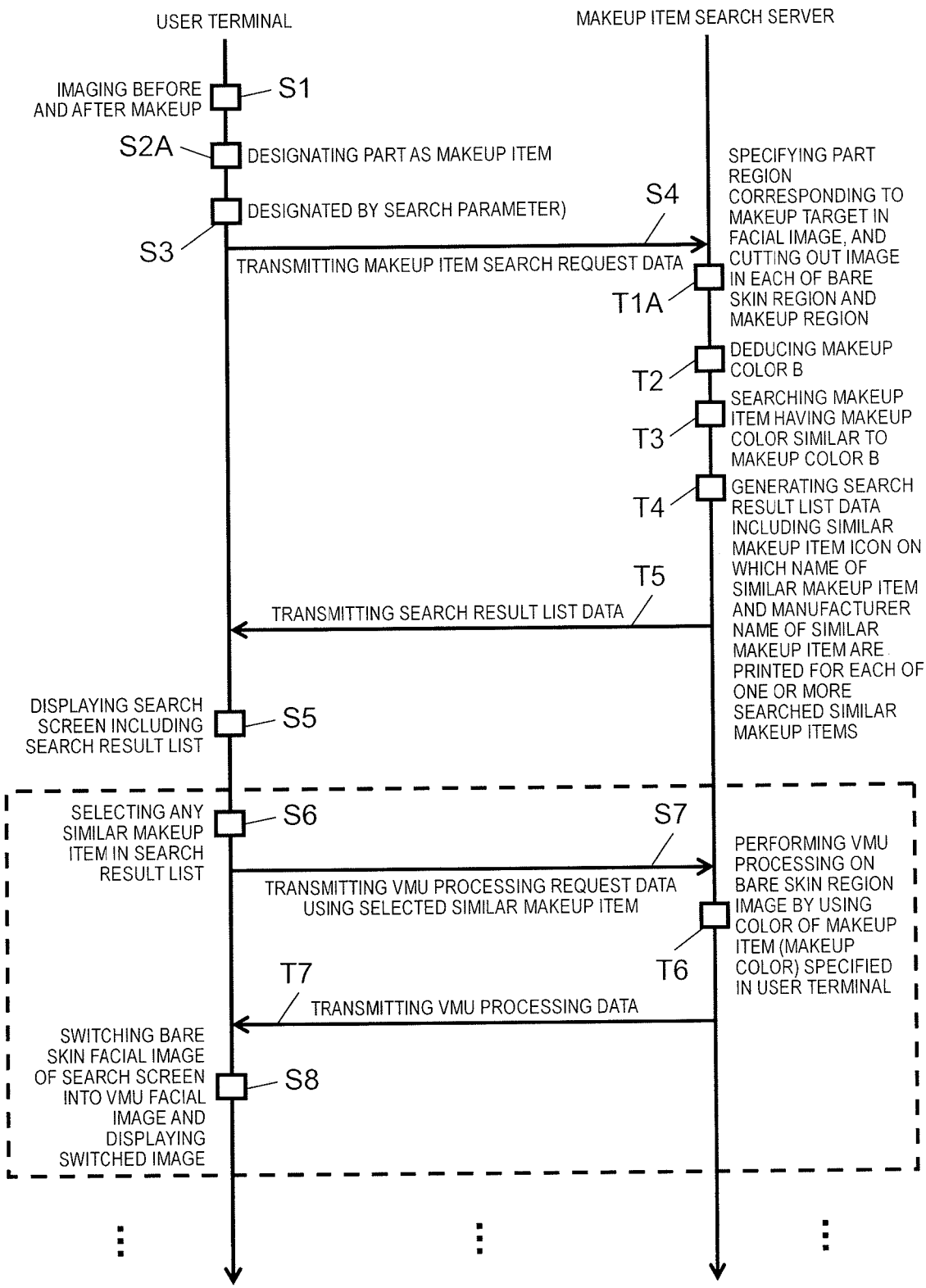
FIG. 6 is a sequence diagram specifically illustrating a second example of an operation procedure relating to search for similar makeup items between the user terminal and the makeup item search server of the present embodiment.

FIG. 6 is a sequence diagram specifically illustrating a second example of an operation procedure relating to search for similar makeup items between user terminal 10 and makeup item search server 50 of the present embodiment. In the description of FIG. 6, the same step number is denoted to the same processing as the processing illustrated in FIG. 5, and the description will be simplified or omitted.

In FIG. 6, after step S1, user terminal 10 receives designation of the type (for example, the lip) of the makeup item with which the user has actually performed makeup in part region selection screen GM2 illustrated in FIG. 8 (S2A).

User terminal 10 generates makeup item search request data including the bare skin facial image and the makeup facial image acquired in step S1, the information on the type (for example, the lip) of the makeup item acquired in step S2A, the information on a search option acquired in step S3 as necessary, and a search request to makeup item search server 50. User terminal 10 transmits the makeup item search request data to makeup item search server 50 (S4).

Makeup item search server 50 receives the makeup item search request data transmitted from user terminal 10 in step S4. Makeup item search server 50 specifies a portion where the user has performed makeup in the bare skin facial image and the makeup facial image based on the bare skin facial image and the makeup facial image included in the makeup item request search data and the information on the type of the makeup item (for example, the lip) (T1A). Makeup item search server 50 cuts out and acquires each of the bare skin region image and the makeup region image from the bare skin facial image and the makeup facial image based on the specification result of the portion where the user has performed makeup (T1A). The processes after step T1A are the same as those in FIG. 5.

As described above, in makeup item presenting system 100 of the present embodiment, user terminal 10 images each of the bare skin facial image (an example of the first image) indicating the facial image of a user before makeup and the makeup facial image (an example of the second image) indicating the facial image of the user after makeup and acquires information on the type or region of the makeup performed by the user. User terminal 10 transmits the imaged bare skin facial image and the makeup facial image, and the information on the type or region of the designated makeup in association with each other to makeup item search server 50. Makeup item search server 50 deduces makeup color B of the makeup performed by the user based on the bare skin facial image and the makeup facial image and the information on the type or region of the makeup performed by the user transmitted from user terminal 10. Makeup item search server 50 searches and extracts at least one similar makeup item having deduced makeup color B based on information on deduced makeup color B and makeup item database 60, and returns the information on at least one extracted similar makeup item to user terminal 10 as search result list data. User terminal 10 displays the information on at least one similar makeup item transmitted from makeup item search server 50 on display 15.

As a result, makeup item search server 50 can extract one or more makeup items similar to the makeup items possessed by the user (that is, the makeup item which matches the user's skin and is the user's favorite), and the extraction result of one or more similar makeup items can be presented to user terminal 10. Therefore, according to makeup item presenting system 100, in a case where the user wants the makeup item similar to the makeup item possessed by the user, it is possible to efficiently search for and select a makeup item adapted to the user's skin color and the coloring at the time of makeup, and thus it is possible to improve convenience when searching for and selecting makeup items of the user. Generally, the coloring (that is, the color of the makeup item) of the makeup item at the time of makeup can be confirmed in a catalog or the like, but if the user does not actually apply it, it is not known exactly whether the coloring at the time of makeup is the same as the color of the makeup item itself. According to the present embodiment, since makeup item search server 50 can extract the similar makeup items that are the same as or similar to makeup color B after deducing the color (makeup color B) when actually performing makeup with the makeup item possessed by the user, based on the bare skin facial image of the user's bare skin (before makeup) and the makeup facial image after makeup, a single similar makeup item that suits the user's wishes can be searched regardless of the makeup item manufacturer (in other words, the brand), and it is possible to improve convenience when the user selects the makeup item.

User terminal 10 transmits, to makeup item search server 50, a processing request for the virtual makeup using the selected one similar makeup item in response to the selection of any one of the similar makeup item displayed on display 15. Makeup item search server 50 performs virtual makeup to the bare skin facial image of the user using one selected similar makeup item. Makeup item search server 50 transmits, to user terminal 10, the VMU processing data including the VMU facial image (an example of the first processed image) subjected to virtual makeup. User terminal 10 displays the VMU facial image included in VMU processing data transmitted from makeup item search server 50 on display 15. With this, the user can confirm an image when virtual makeup is performed on the user's bare skin facial image with the selected similar makeup items by the simple operation of selecting the similar makeup item which she or he is interested in among the one or more search result lists (that is, the similar makeup items) displayed on display 15 of user terminal 10, and thereby it is possible to encourage the user's willingness to purchase the similar makeup item.

User terminal 10 transmits the information on the brightness or saturation of the makeup color of the makeup item with which the user has performed makeup to makeup item search server 50 with the information on the type or region of the makeup and the makeup item search request data. Makeup item search server 50 extracts at least one similar makeup item that is the same as or similar to deduced makeup color B based on the information on deduced makeup color B, makeup item database 60, and the information on the brightness or saturation of the makeup color. In this way, based on the coloring of the makeup items that he or she used during makeup, the user can simply search request to makeup item search server 50 the similar makeup items considering the balance of the finish of makeup including adjustment of both or one of lightness and brightness. Based on the coloring of the makeup item that is used at the time of makeup with search result list data from makeup item search server 50 on display 15, the user can select the makeup items that she or he interested in among the similar makeup item lists considering the balance of the finish at the time of makeup including adjustment of both or one of the lightness and brightness, and thus user's selection width (in other words, the number of makeup item candidates that can be purchased) of the makeup items that she or he wants to purchase can be increased.

User terminal 10 displays a symmetrical facial image obtained by symmetrically connecting the left half or right half size image of the frame of bare skin facial image NF1 to the right half or left half size image of the frame of makeup facial image RMU1 on search result list screen GM3 on which the information on at least one similar makeup item transmitted from makeup item search server 50 is displayed on display 15 (refer to FIG. 9). As a result, since bare skin facial image NF1 and makeup facial image RMU1 are symmetrically displayed on display 15, the user can easily compare, for example, the coloring and gloss at the time of makeup in the portion where makeup is performed while looking at bare skin facial image NF1 and makeup facial image RMU1.

Makeup item search server 50 extracts a plurality of similar makeup items that are the same as or similar to the deduced makeup color B, and transmits information on the plurality of similar makeup items to user terminal 10. User terminal 10 displays on display 15 one symmetrical facial image and the information on the plurality of similar makeup items in association with each other (refer to FIG. 9). Since bare skin facial image NF1 and makeup facial image RMU1 are symmetrically displayed on display 15, and the search results of the plurality of similar makeup item are displayed on the same display 15, the user can easily determine which similar makeup items are similar to the actual coloring during makeup by comparing bare skin facial image NF1 and makeup facial image RMU1 with the plurality of similar makeup items.

Makeup item search server 50 extracts a plurality of similar makeup items that are the same as or similar to the deduced makeup color B, and transmits information on the plurality of similar makeup items to user terminal 10. In a case where the number of the similar makeup items extracted by makeup item search server 50 is N (N: an integer of 2 or more), user terminal 10 superimposes information on different similar makeup item on each of the N symmetrical facial images, and displays the information on display 15 (refer to FIG. 10). The user can compare with eyes the image in which VMU facial image with virtual makeup using each one of similar makeup items and the makeup facial image are symmetrically connected to each other in search result list screen GM4 displayed on the same display 15, and thus can efficiently select similar makeup items that she or he is interested in.

User terminal 10 displays icons having a predetermined size (for example, similar makeup item icons LP1, LP2, LP3, LP4, LP5, and LP6) with the makeup color of the similar makeup item as the background color on display 15 as information on the similar makeup item. The user can easily confirm the color of one or more similar makeup items extracted by the makeup item search server 50 by the background color of the similar makeup item icon, and it is possible to improve convenience when the user selects the makeup item.

Although various embodiments are described above while referring to the drawings, needless to say, the present disclosure is not limited to Examples. It is obvious that it is possible for those skilled in the art to conceive of various Modification Examples and Correction Examples within the scope which is set forth in the claims, and therein is naturally understood as belonging to the technical scope of the present disclosure. The components in the above embodiment may be optionally combined without departing from the spirit of the invention.

In the present embodiment described above, in a case where any similar makeup item is selected in user terminal 10 by the user's operation, makeup item search server 50 performs the virtual makeup processing on the bare skin facial image of the user using the similar makeup item. However, in a case where any similar makeup item is selected by the user's operation, user terminal 10 itself may perform the virtual makeup processing on the bare skin facial image of the user using the similar makeup item, and display the facial image after the virtual makeup processing on display 15. With this, even in a case where the communication environment between user terminal 10 and makeup item search server 50 is poor, the user can quickly confirm the image after the virtual makeup processing by selecting any similar makeup item to user terminal 10, and thereby usability is further improved.

INDUSTRIAL APPLICABILITY

The present disclosure is useful as a makeup item presenting system, a makeup item presenting method, and a makeup item presenting server which can improve convenience when the user selects the makeup item by extracting one or more makeup items similar to those possessed by the user, and presenting the extraction results of one or more similar makeup items on the user terminal.

REFERENCE MARKS IN THE DRAWINGS

10 USER TERMINAL
11 CAMERA UNIT (IMAGING UNIT)
12, 52 PROCESSOR
13, 53 MEMORY
14 OPERATION INPUT UNIT (INSTRUCTION UNIT)
15 DISPLAY (DISPLAY UNIT)
16, 56 COMMUNICATION UNIT
50 MAKEUP ITEM SEARCH SERVER
51 DATA STORAGE UNIT
55 MAKEUP ITEM DB INTERFACE
60 MAKEUP ITEM DATABASE (MAKEUP ITEM DB)
70 MAKEUP ITEM PURCHASING SERVER
80 PURCHASING HISTORY DATABASE (PURCHASING HISTORY DB)
100 MAKEUP ITEM PRESENTING SYSTEM
521 REGION SPECIFICATION UNIT
522 MAKEUP COLOR DEDUCTION UNIT
523 MAKEUP COLOR SEARCH UNIT
524 MAKEUP SYNTHESIS UNIT
GM1 INITIAL SCREEN
GM2 PART REGION SELECTION SCREEN
GM3, GM4 SEARCH RESULT LIST SCREEN
TP TOUCH PANEL

The invention claimed is:

1. A makeup item presenting system in which a terminal including a display, and a server are communicably connected to the terminal,
wherein the terminal includes:
a first memory that stores instructions; and
a first processor that, when executing the instructions stored in the first memory, performs a process comprising:
imaging by an imaging unit each of a first image indicating a facial image of a user before makeup and a second image indicating a facial image of the user after makeup,
receiving a designation instruction of information on a type or region of makeup performed by the user, and transmitting, to the server, the captured first image and second image with associated information on a designated type or region of makeup,
wherein the server includes:
a second memory that stores instructions; and
a second processor that, when executing the instructions stored in the second memory, performs a process comprising:
deducing a makeup color of the makeup performed by the user based on the first image and the second image and the information on the type or region of the makeup performed by the user, transmitted from the terminal,
extracting at least one similar makeup item having the deduced makeup color based on information on the deduced makeup color and a makeup item database, and
transmitting information on at least one extracted similar makeup item to the terminal, wherein
the first processor of the terminal displays, on the display, the information on at least one similar makeup item transmitted from the server.

2. The makeup item presenting system of claim 1,
wherein the process performed by the first processor further includes transmitting, to the server, a processing request for virtual makeup using the selected similar makeup item according to the selection of the similar makeup item,
wherein the process performed by the second processor further includes performing the virtual makeup on the first image using the selected similar makeup item, and transmitting, to the terminal, the first processed image on which the virtual makeup is performed, and
wherein the terminal displays the first processed image transmitted from the server on the display.

3. The makeup item presenting system of claim 1,
wherein the process performed by the first processor further includes transmitting information on brightness and saturation of a makeup color of the makeup item with which the user has performed the makeup to the server as information on the type or region of the makeup, and
wherein the process performed by the second processor further includes extracting at least one similar makeup item that is the same as or similar to deduced makeup color based on the information on the deduced makeup color, a makeup item database, and information on the brightness and the saturation of the makeup color.

4. The makeup item presenting system of claim 1,
wherein the process performed by the first processor further includes displaying a symmetrical facial image obtained by symmetrically connecting a left half or right half size image of a frame of the first image to a right half or left half size image of a frame of the second image on a screen for displaying information on at least one similar makeup item transmitted from the server on the display.

5. The makeup item presenting system of claim 4,
wherein the process performed by the second processor further includes extracting a plurality of similar makeup items that are the same as or similar to the deduced makeup color, and transmits information on the plurality of similar makeup items to the terminal, and
wherein the process performed by the first processor further includes displaying one symmetrical facial image and the information on the plurality of similar makeup items in association with each other on the display unit.

6. The makeup item presenting system of claim 4,
wherein the process performed by the second processor further includes extracting a plurality of similar makeup items that are the same as or similar to the deduced makeup color, and transmits information on the plurality of similar makeup items to the terminal, and
wherein in a case where the number of the similar makeup items extracted by the server is N (N: an integer of 2 or more), the process performed by the first processor further includes superimposing information on different similar makeup item on each of the N symmetrical facial images, and displays the information on the display.

7. The makeup item presenting system of claim 1,
wherein the process performed by the first processor further includes displaying an icon having a predetermined size with the makeup color of the similar makeup item as a background color on the display as information on the similar makeup item.

8. A makeup item presenting method, the method comprising:
imaging, by a terminal, each of a first image indicating a facial image of a user before makeup and a second image indicating a facial image of the user after makeup,
receiving, by the terminal, a designation of information on a type or region of makeup performed by the user,
transmitting, from the terminal, to a server, the captured first image and second image associated with information on a designated type or region of makeup,
deducing, by the server, a makeup color of the makeup performed by the user based on the first image and the second image transmitted from the terminal and the information on the type or region of the makeup performed by the user,
extracting, by the server, at least one similar makeup item having the deduced makeup color based on information on the deduced makeup color and a makeup item database,
transmitting, from the server to the terminal, information on at least one extracted similar makeup item to the terminal, and
displaying, on a display of the terminal, the information on at least one similar makeup item transmitted from the server.

9. A makeup item presenting server which is communicably connected to a terminal including a display, comprising:
a memory that stores instructions; and
a processor that, when executing the instructions stored in the memory, performs a process comprising:
receiving, from the terminal, a first image indicating a facial image of a user before makeup, a second image indicating a facial image of the user after makeup, and information on a type or region of makeup performed by the user;
deducing a makeup color of the makeup performed by the user based on the received first image, second image, and information on the type or region of the makeup performed by the user;

extracting at least one similar makeup item having the deduced makeup color based on information on the deduced makeup color and a makeup item database; and transmitting the information on at least one extracted similar makeup item to the terminal to cause the terminal to display the information on the display.

10. A makeup item presenting method using a makeup item presenting server which is communicably connected to a terminal including a display unit, the method comprising:

receiving, from the terminal, a first image indicating a facial image of a user before makeup, a second image indicating a facial image of the user after makeup, and information on a type or region of makeup performed by the user;

deducing a makeup color of the makeup performed by the user based on the received first image, second image, and information on the type or region of the makeup performed by the user;

extracting at least one similar makeup item having the deduced makeup color based on information on the deduced makeup color and a makeup item database; and transmitting the information on at least one extracted similar makeup item to the terminal to cause the terminal to display the information on the display.

* * * * *